(12) United States Patent
Takahashi et al.

(10) Patent No.: US 6,485,179 B1
(45) Date of Patent: Nov. 26, 2002

(54) DYNAMIC PRESSURE BEARING

(75) Inventors: Takeshi Takahashi, Kashiba (JP); Yasuo Takamura, Yamatokoriyama (JP); Daiji Hiraoka, Nara-ken (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 0 days.

(21) Appl. No.: 09/656,077

(22) Filed: Sep. 6, 2000

(30) Foreign Application Priority Data

Sep. 8, 1999 (JP) ............................................. 11-254168

(51) Int. Cl.[7] .............................. F16C 33/72; F16C 32/06
(52) U.S. Cl. ......................... 384/132; 384/100; 384/119
(58) Field of Search ................................. 384/119, 132, 384/100, 124

(56) References Cited

U.S. PATENT DOCUMENTS

| | | | | |
|---|---|---|---|---|
| 5,423,612 A | * | 6/1995 | Zang et al. ............. | 384/132 X |
| 5,722,775 A | | 3/1998 | Thijsse et al. ............. | 384/119 |
| 5,765,952 A | * | 6/1998 | Dekker et al. ............. | 384/132 |
| 6,079,879 A | * | 6/2000 | Takahashi ................... | 384/119 |

\* cited by examiner

Primary Examiner—Thomas R. Hannon
(74) Attorney, Agent, or Firm—Jordan and Hamburg LLP

(57) ABSTRACT

A dynamic pressure bearing is provided in which leakage of liquid lubricant due to precession of a housing can be prevented from occurring. In the dynamic pressure bearing, the inner diameter of a tapered inner peripheral face 20 of the housing 1 which constitutes a capillary sealing portion 23 is gradually increased as moving from an opening 17 toward the inner area in the axial direction. When the housing 1 is rotated, therefore, a centrifugal force applied on liquid lubricant existing on the tapered inner peripheral face 20 acts in the direction along which the liquid lubricant is pushed toward the inner area, as indicated by an arrow 19. Consequently, the centrifugal force which is due to precession of the housing 1, and which pushes the liquid lubricant 15 toward the outside as indicated by an arrow 29 can be cancelled by the force acting in the direction toward the inner area, with the result that leakage of the liquid lubricant due to precession of the housing 1 can be prevented from occurring.

28 Claims, 4 Drawing Sheets

DYNAMIC PRESSURE BEARING

BACKGROUND OF THE INVENTION

The invention relates to a dynamic pressure bearing having a mechanism for preventing liquid lubricant from leaking.

FIG. 4 shows such a type of dynamic pressure bearing of the conventional art. The dynamic pressure bearing has a dynamic pressure bearing portion 83 which is formed between a housing 81 and a shaft 82. A capillary seal 85 is formed in an opening end of the housing 81. The capillary seal 85 is configured by a tapered shaft portion 86, and an inner peripheral face 87 of the housing 81 which is opposed to the portion. The inner peripheral face 87 is configured by: a tapered portion 88 in which the diameter is gradually reduced as moving from the opening toward the inner area in the axial direction; and a straight portion 89 which is continuous at a constant diameter to the bearing portion 83.

In the capillary seal 85, the clearance between the shaft 82 and the housing 81 is gradually reduced as moving toward the inner area in the axial direction. Therefore, liquid lubricant is sucked by capillary action into the side of the bearing portion 83, thereby preventing the lubricant from leaking.

When the rotation center axis of the housing 81 revolves about the center axis of the shaft 82 or the housing performs whirling movement (precession movement), a centrifugal force acts in a direction along which the liquid lubricant is discharged to the outside of the bearing portion 83. This produces a problem in that, when the centrifugal force exceeds the capillary effect of the capillary seal 85, the liquid lubricant leaks out from the opening of the housing 81.

SUMMARY OF THE INVENTION

Therefore, it is an object of the invention to provide a dynamic pressure bearing in which leakage of liquid lubricant due to precession of a housing can be prevented from occurring.

In order to attain the object, the dynamic pressure bearing of the invention of claim 1 is a dynamic pressure bearing in which a shaft is inserted into a housing, and dynamic pressure grooves are formed in at least one of a bearing portion of the housing and an outer peripheral face of the shaft, wherein the shaft has a tapered shaft portion which is adjacent to the bearing portion, and in which a diameter is gradually reduced as moving toward an opening of the housing, the housing has a tapered inner peripheral face which is opposed to the tapered shaft portion, and in which an inner diameter is gradually increased as moving from the opening toward an inner area in an axial direction, the tapered shaft portion and the tapered inner peripheral face constitute a capillary sealing portion, and a clearance between the tapered shaft portion and the tapered inner peripheral face is gradually reduced as moving from the opening toward the inner area in the axial direction.

In the dynamic pressure bearing of the invention, the inner diameter of the tapered inner peripheral face of the housing which constitutes the capillary sealing portion is gradually increased as moving from the opening toward the inner area in the axial direction. When the housing is rotated, therefore, a centrifugal force applied on liquid lubricant existing on the tapered inner peripheral face acts in the direction along which the liquid lubricant is pushed toward the inner area. Consequently, the centrifugal force which is due to precession of the housing, and which pushes the liquid lubricant toward the outside can be cancelled by the force acting in the direction along which the liquid lubricant is pushed toward the inner area, with the result that leakage of the liquid lubricant due to precession of the housing can be prevented from occurring.

DETAILED DESCRIPTION OF THE PREFERRED EMBODIMENTS

Hereinafter, the invention will be described in more detail by means of illustrated embodiments.

[First Embodiment]

Figure 1:
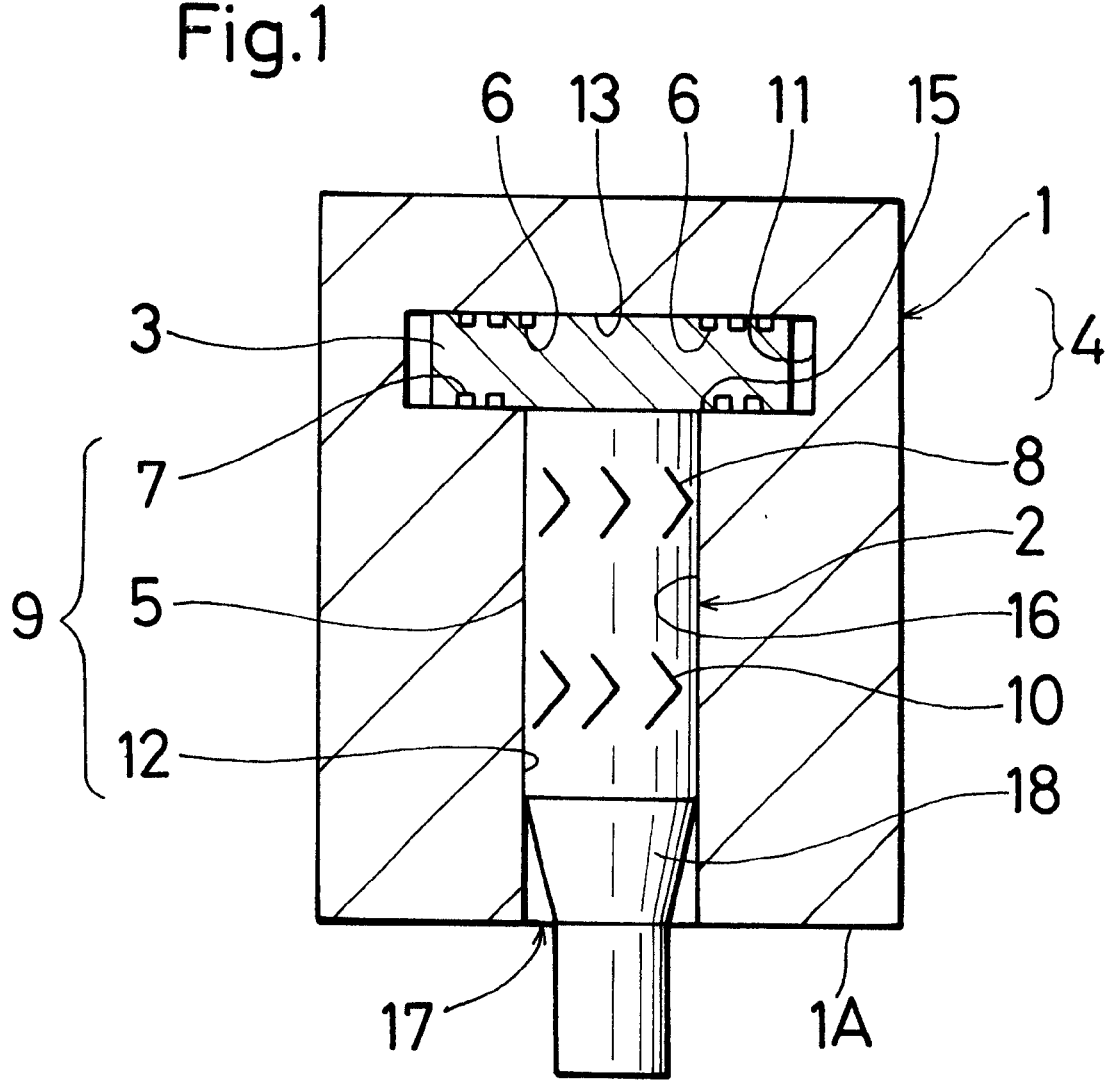
FIG. 1 is a section view showing the whole of a first embodiment of the dynamic pressure bearing of the invention.

FIG. 1 shows the whole of a first embodiment of the dynamic pressure bearing of the invention. The dynamic pressure bearing is configured by a housing 1 and a shaft 2 inserted into the housing 1. The gap between the housing 1 and the shaft 2 is filled with liquid lubricant (not shown). The shaft 2 is configured by a flange 3 and the shaft body 5. Dynamic pressure grooves 6 and 7 for thrust supporting are formed in both end faces of the flange 3. Dynamic pressure grooves 8 and 10 for radial supporting are formed in the outer peripheral face of the shaft body 5. The flange 3 of the shaft 2 is placed in a large diameter portion 11 of the housing 1. The shaft body 5 is placed in a small diameter portion 12 which axially elongates from the large diameter portion 11, and which is opened in an end face 1A.

The dynamic pressure grooves 6 and 7 which are formed on the flange 3 of the shaft 2, and faces 13 and 15 forming the large diameter portion 11 of the housing 1 constitute a thrust bearing portion 4. The dynamic pressure grooves 8 and 10 of the shaft body 5, and a peripheral face 16 of the small diameter portion 12 which is opposed to the dynamic pressure grooves 8 and 10 constitute a radial bearing portion 9. The shaft 2 comprises a tapered portion 18 which is adjacent to the radial bearing portion 9, and in which the diameter is gradually reduced as moving toward an opening 17 of the housing 1.

Figure 2:
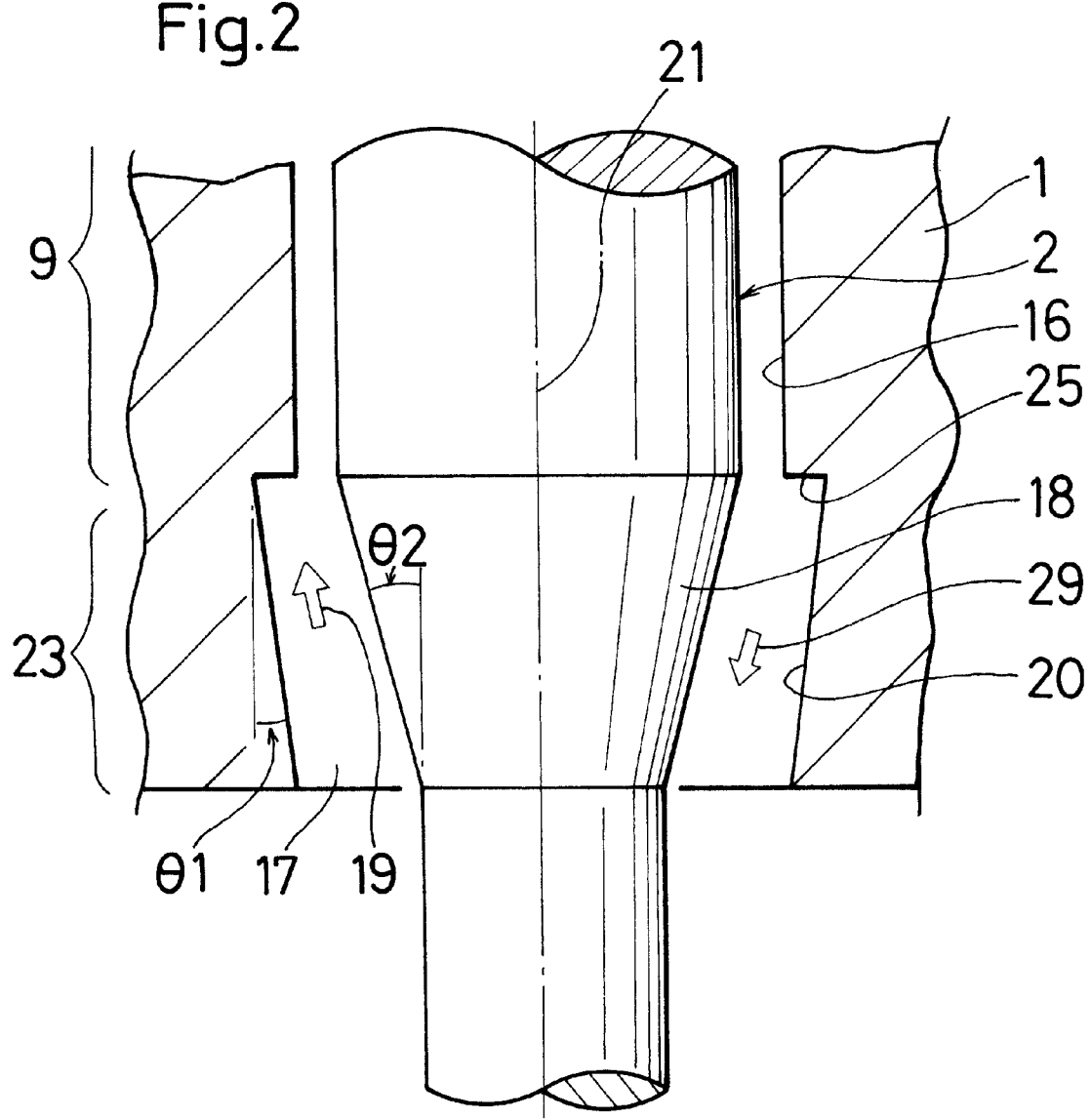
FIG. 2 is an enlarged section view showing a capillary sealing portion of the first embodiment.

As shown in FIG. 2, the housing 1 has a tapered inner peripheral face 20 which is adjacent to the radial bearing portion 9, which is opposed to the tapered portion 18 of the shaft 2, and in which the inner diameter is gradually increased as moving from the opening 17 toward the inner area in the axial direction. The inclination angle θ1 (for example, 1° to 2°) of the tapered inner peripheral face 20 with respect to the center axis 21 is smaller than the inclination angle θ2 (for example, 4° to 6°) of the tapered portion 18 of the shaft 2 with respect to the center axis 21. Therefore, the radial clearance between the tapered inner peripheral face 20 and the tapered portion 18 is gradually reduced as moving from the opening 17 toward the inner area in the axial direction. The tapered inner peripheral face 20 and the tapered portion 18 constitute a capillary sealing portion 23.

The tapered inner peripheral face 20 of the capillary sealing portion 23 is continuous in a radial step face 25 to the peripheral face 16 of the radial bearing portion 9, to form a recess with respect to the peripheral face 16.

In the dynamic pressure bearing, the inner diameter of the tapered inner peripheral face 20 of the housing 1 which constitutes the capillary sealing portion 23 is gradually increased as moving from the opening 17 toward the inner area in the axial direction. When the housing 1 is rotated, therefore, a centrifugal force applied on the liquid lubricant existing on the tapered inner peripheral face 20 acts in the direction along which the liquid lubricant is pushed toward the inner area, as indicated by the arrow 19. Consequently, the centrifugal force which is due to precession of the housing 1 and which pushes the liquid lubricant toward the outside as indicated by the arrow 29 can be cancelled by the force which pushes the liquid lubricant toward the inner area, with the result that leakage of the liquid lubricant due to precession of the housing 1 can be prevented from occurring.

Since the radial clearance between the tapered inner peripheral face 20 and the tapered portion 18 which constitute the capillary sealing portion 23 is gradually reduced as moving from the opening 17 toward the inner area in the axial direction, the effect of preventing leakage can be enhanced by the capillary action.

[Second Embodiment]

Figure 3:
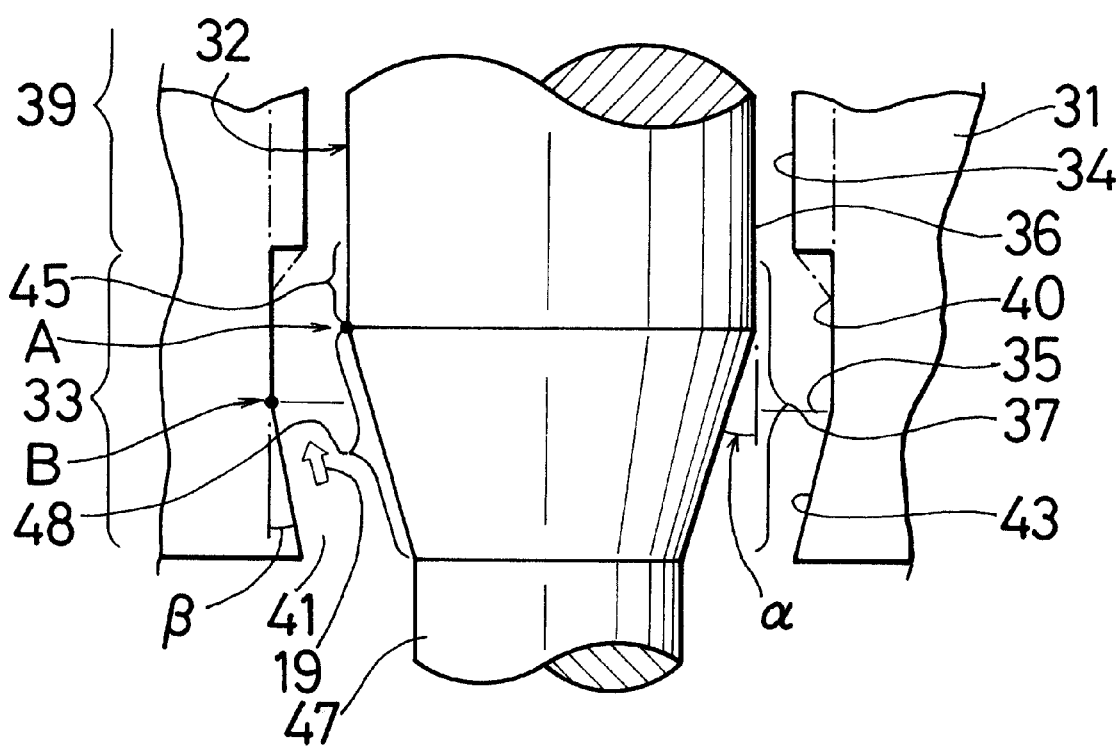
FIG. 3 is an enlarged section view showing a capillary sealing portion of a second embodiment of the invention.
Figure 4:
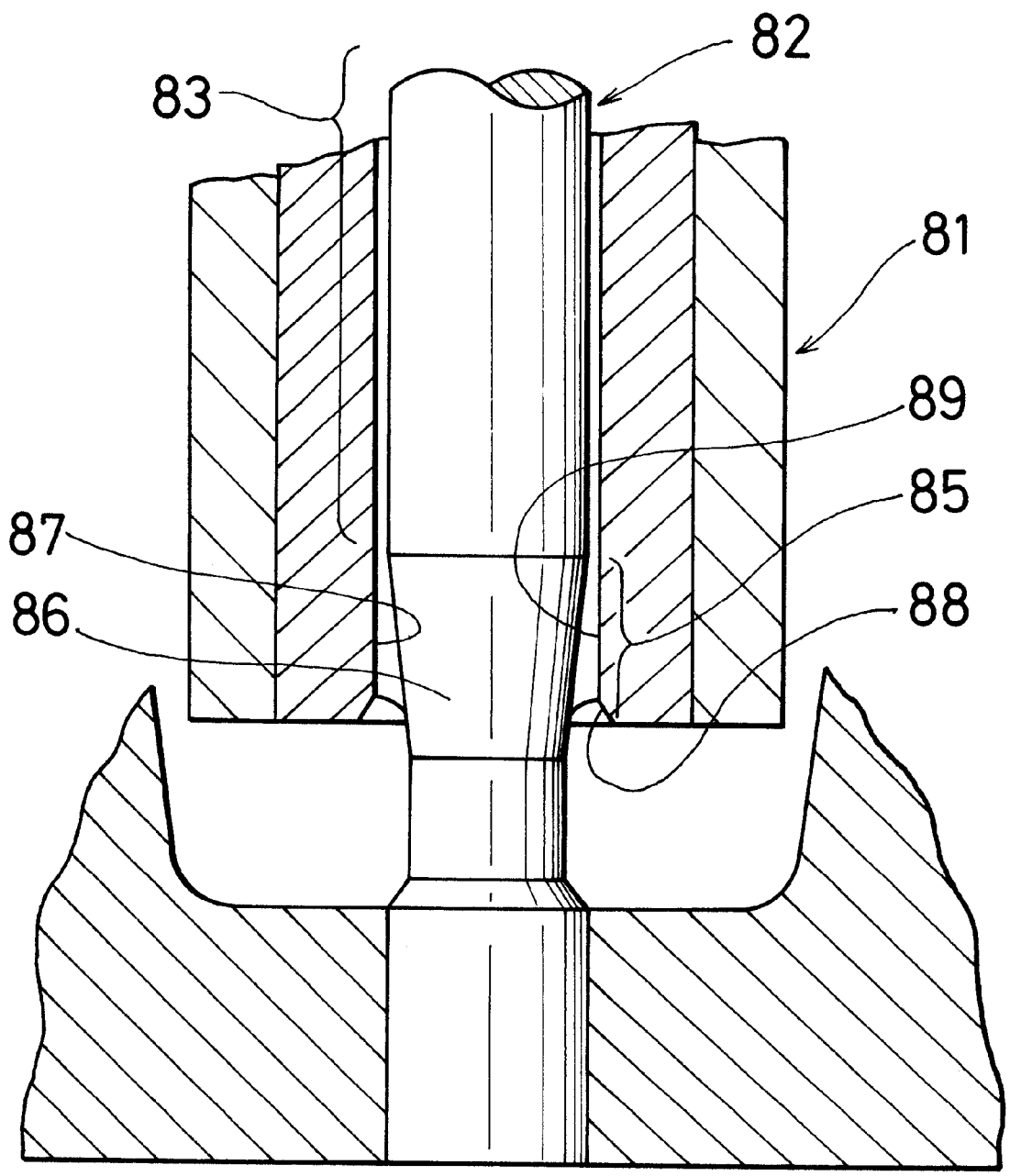
FIG. 4 is a section view showing the structure of a periphery of a capillary sealing portion of a dynamic pressure bearing of the conventional art.

FIG. 3 shows the structure of a capillary sealing portion of a second embodiment of the dynamic pressure bearing of the invention.

The second embodiment is different from the first embodiment described above, only in the configuration of the capillary sealing portion. Therefore, description will be made with placing emphasis on the configuration of the capillary sealing portion.

The capillary sealing portion 33 in the second embodiment is configured by: a tapered inner peripheral face 35 which is adjacent to a radial bearing portion 39, and which is radially recessed from the level of an inner bearing peripheral face 34 of a housing 31; and a tapered portion 37 which is adjacent to an outer bearing peripheral face 36 of a shaft 32.

The tapered inner peripheral face 35 of the housing 31 is configured by: a constant diameter face 40 a diameter of which is larger than that of the inner bearing peripheral face 34 and is constant; and a reduced diameter face 43 in which the diameter is gradually reduced as moving from the constant diameter face 40 toward an opening 41. By contrast, the tapered portion 37 of the shaft 32 is configured by: a constant diameter portion 45 which is adjacent to the outer bearing peripheral face 36; and a reduced diameter portion 48 in which the diameter is gradually reduced as moving from the constant diameter portion 45 toward a thin shaft portion 47.

The constant diameter face 40 of the housing 31 is longer in dimension in the axial direction than the constant diameter portion 45 of the shaft 32. The inclination angle α of the reduced diameter portion 48 of the shaft 32 with respect to the constant diameter portion 45 is larger than the inclination angle β of the reduced diameter face 43 of the housing 31 with respect to the constant diameter face 40 ($\alpha > \beta$). The inclination angle α may be set to a range of $0° < \alpha \leq 10°$, and the inclination angle β may be set to a range of $0° < \beta < 10°$.

In the second embodiment, since the axial dimension of the constant diameter face 40 of the housing 31 is longer than that of the constant diameter portion 45 of the shaft 32, a bending point B of the reduced diameter face 43 of the housing 31 is positioned more closer to the opening 41 than a bending point A of the reduced diameter portion 48 the shaft 32. According to this configuration, the centrifugal force which, when the housing 31 is rotated, pushes the liquid lubricant existing on the reduced diameter face 43 in the direction of the arrow 19 can be suppressed as compared with that in the first embodiment. Therefore, the centrifugal force does not excessively act, so that air which may cause leakage of the liquid lubricant is prevented from being caught by the rotation.

In the second embodiment, the radial clearance between the tapered inner peripheral face 35 and the tapered portion 37 which constitute the capillary sealing portion 33 is gradually reduced as moving from the opening 41 toward the inner area in the axial direction. Therefore, the effect of preventing leakage can be enhanced by the capillary action.

In the second embodiment, since the bending point B of the reduced diameter face 43 of the housing 31 is positioned more closer to the opening 41 than the bending point A of the reduced diameter portion 48 the shaft 32, there is no region where the radial clearance is gradually increased as moving from the opening 41 toward the radial bearing portion 39. According to this configuration, it is possible to prevent capillary action which pulls the liquid lubricant toward the opening 41, from being produced, and hence the defect that leakage easily occurs can be eliminated.

In the second embodiment, the constant diameter face 40 of the tapered inner peripheral face 35 of the housing 31 is rectangularly recessed from the inner bearing peripheral face 34. Alternatively, the constant diameter face may be obliquely recessed from the inner bearing peripheral face 34 as indicated by the broken lines, or the radial level of the inner bearing peripheral face 34 may be set to be equal to that of the constant diameter face 40 as indicated by the long-short dash line. In the first and second embodiments, the inclined faces are linearly inclined. Alternatively, the faces may be curvedly inclined.

As apparent from the above description, in the dynamic pressure bearing of the invention of claim 1, the inner diameter of the tapered inner peripheral face of the housing which constitutes the capillary sealing portion is gradually increased as moving from the opening toward the inner area in the axial direction. When the housing is rotated, therefore, a centrifugal force applied on liquid lubricant existing on the tapered inner peripheral face acts in the direction along which the liquid lubricant is pushed toward the inner area. Consequently, the centrifugal force due to precession of the housing can be cancelled by the force acting in the direction along which the liquid lubricant is pushed toward the inner area, with the result that leakage of the liquid lubricant due to precession of the housing can be prevented from occurring.

What is claimed is:

1. A dynamic pressure bearing assembly, comprising:
   a housing defining a bore and a bore opening having a bore opening diameter;
   a shaft disposed in said bore extending through said opening and defining a shaft axis, said shaft having a first shaft diameter portion having a first shaft diameter, a second shaft diameter portion having a second shaft diameter less than said first shaft diameter, and a tapered shaft portion between said first shaft diameter portion and said second shaft diameter portion and defining a shaft inclination angle with respect to said shaft axis;
   said bore having a first bore diameter portion having a first bore diameter and opposing said first shaft diameter portion and defining a first gap region therebetween;
   said bore having a second bore diameter portion having a second bore diameter greater than said first bore diameter and opposing said first shaft diameter portion and said tapered shaft portion to define:
      a second gap region between said second bore diameter portion and said first shaft diameter portion; and
      a third gap region between said second bore diameter portion and said tapered shaft portion;
   said bore having a tapered bore portion between said second diameter bore portion and said bore opening defining a bore inclination angle with respect to said shaft axis wherein said second bore diameter is greater than said bore opening diameter, and said tapered bore portion and said tapered shaft portion define a fourth gap region therebetween;
   said first gap region having a first gap region radial width;
   said second gap region having a second gap region radial width greater than said first gap region radial width;
   said third gap region having an increasing third gap region radial width, increasing towards said bore opening, which is increasingly greater than said second gap region radial width; and
   said fourth gap region having an increasing fourth gap region radial width, increasing towards said bore opening, which is increasingly greater than a largest size of said increasing third gap region radial width;
   wherein said second, third and fourth gap regions form a capillary seal.

2. The dynamic pressure bearing assembly according to claim 1, further comprising a bore step interconnecting said first bore portion and said second bore portion.

3. The dynamic pressure bearing assembly according to claim 2, wherein said shaft inclination angle is between 0° and 10°.

4. The dynamic pressure bearing assembly according to claim 3, wherein said bore inclination angle is between 0° and 10°.

5. The dynamic pressure bearing assembly according to claim 2, wherein said bore inclination angle is between 0° and 10°.

6. The dynamic pressure bearing assembly according to claim 2, wherein said shaft inclination angle is between 4° and 6°.

7. The dynamic pressure bearing assembly according to claim 6, wherein said bore inclination angle is between 1° and 2°.

8. The dynamic pressure bearing assembly according to claim 2, wherein said bore inclination angle is between 1° and 2°.

9. A dynamic pressure bearing assembly according to claim 1, further comprising a bore taper interconnecting said first bore portion and said second bore portion.

10. The dynamic pressure bearing assembly according to claim 9, wherein said shaft inclination angle is between 0° and 10°.

11. The dynamic pressure bearing assembly according to claim 10, wherein said bore inclination angle is between 0° and 10°.

12. The dynamic pressure bearing assembly according to claim 9, wherein said bore inclination angle is between 0° and 10°.

13. The dynamic pressure bearing assembly according to claim 9, wherein said shaft inclination angle is between 4° and 6°.

14. The dynamic pressure bearing assembly according to claim 13, wherein said bore inclination angle is between 1° and 2°.

15. The dynamic pressure bearing assembly according to claim 9, wherein said bore inclination angle is between 1° and 2°.

16. The dynamic pressure bearing assembly according to claim 1, wherein said shaft inclination angle is between 0° and 10°.

17. The dynamic pressure bearing assembly according to claim 16, wherein said bore inclination angle is between 0° and 10°.

18. The dynamic pressure bearing assembly according to claim 1, wherein said bore inclination angle is between 0° and 10°.

19. The dynamic pressure bearing assembly according to claim 1, wherein said shaft inclination angle is between 4° and 6°.

20. The dynamic pressure bearing assembly according to claim 19, wherein said bore inclination angle is between 1° and 2°.

21. The dynamic pressure bearing assembly according to claim 1, wherein said bore inclination angle is between 1° and 2°.

22. A dynamic pressure bearing assembly, comprising:
   a housing defining a bore opening having a bore opening diameter;
   a shaft disposed in said bore extending through said opening and defining a shaft axis, said shaft having a first shaft diameter portion having a first shaft diameter, a second shaft diameter portion having a second shaft diameter less than said first shaft diameter, and a tapered shaft portion interconnecting said first shaft diameter portion and said second shaft diameter portion and defining a shaft inclination angle with respect to said shaft axis;
   said bore having a first bore diameter portion having a first bore diameter and opposing said first shaft diameter portion and defining a first gap region therebetween;

said bore having a second bore diameter portion having a second bore diameter greater than said first bore diameter and opposing said first shaft diameter portion and said tapered shaft portion to define:
  a second gap region between said second bore diameter portion and said first shaft diameter portion; and
  a third gap region between said second bore diameter portion and said tapered shaft portion;
said bore having a tapered bore portion extending from said second diameter bore portion to said bore opening defining a bore inclination angle with respect to said shaft axis wherein said second bore diameter is greater than said bore opening diameter, and said tapered bore portion and said tapered shaft portion define a fourth gap region therebetween;
said first gap region having a first gap region radial width;
said second gap region having a second gap region radial width greater than said first gap region radial width;
said third gap region having an increasing third gap region radial width, increasing towards said bore opening, which is increasingly greater than said second gap region radial width; and
said fourth gap region having an increasing fourth gap region radial width, increasing towards said bore opening, which is increasingly greater than a largest size of said increasing third gap region radial width;
wherein said second, third and fourth gap regions form a capillary seal.

23. The dynamic pressure bearing assembly according to claim 22, wherein said shaft inclination angle is between 0° and 10°.

24. The dynamic pressure bearing assembly according to claim 23, wherein said bore inclination angle is between 0° and 10°.

25. The dynamic pressure bearing assembly according to claim 22, wherein said bore inclination angle is between 0° and 10°.

26. The dynamic pressure bearing assembly according to claim 22, wherein said shaft inclination angle is between 4° and 6°.

27. The dynamic pressure bearing assembly according to claim 26, wherein said bore inclination angle is between 1° and 2°.

28. The dynamic pressure bearing assembly according to claim 22, wherein said bore inclination angle is between 1° and 2°.

\* \* \* \* \*